(12) United States Patent
Park et al.

(10) Patent No.: US 9,008,072 B2
(45) Date of Patent: *Apr. 14, 2015

(54) METHOD OF PERFORMING UPLINK SYNCHRONIZATION IN RANDOM ACCESS PROCEDURE

(75) Inventors: Sung Jun Park, Anyang-si (KR); Seung June Yi, Anyang-si (KR); Young Dae Lee, Anyang-si (KR); Sung Duck Chun, Anyang-si (KR)

(73) Assignee: Optis Cellular Technology, LLC, Plano, TX (US)

( * ) Notice: Subject to any disclaimer, the term of this patent is extended or adjusted under 35 U.S.C. 154(b) by 521 days.

This patent is subject to a terminal disclaimer.

(21) Appl. No.: 12/909,780

(22) Filed: Oct. 21, 2010

(65) Prior Publication Data

US 2011/0038361 A1 Feb. 17, 2011

Related U.S. Application Data

(63) Continuation of application No. 12/392,654, filed on Feb. 25, 2009, now Pat. No. 7,843,895.

(30) Foreign Application Priority Data

Mar. 14, 2008 (KR) .................. 10-2008-0023807

(51) Int. Cl.
*H04J 3/06* (2006.01)
*H04B 7/26* (2006.01)
*H04W 56/00* (2009.01)
*H04W 74/00* (2009.01)
*H04W 74/08* (2009.01)

(52) U.S. Cl.
CPC ......... *H04B 7/2681* (2013.01); *H04W 56/0045* (2013.01); *H04W 74/002* (2013.01); *H04W 74/0833* (2013.01)

(58) Field of Classification Search
None
See application file for complete search history.

(56) References Cited

U.S. PATENT DOCUMENTS

| 6,347,120 B1 * | 2/2002 | Sakoda ..................... 375/259 |
| 7,436,801 B1 | 10/2008 | Kanterakis |
| 2002/0041578 A1 | 4/2002 | Kim et al. |
| 2006/0073836 A1 | 4/2006 | Laroia et al. |
| 2007/0184865 A1 * | 8/2007 | Phan et al. ................ 455/509 |
| 2008/0043671 A1 | 2/2008 | Moon et al. |

(Continued)

OTHER PUBLICATIONS

3GPP TSG RAN WG1#48 bis: Transmission of Uplink Timing Advance Command in E-UTRA; R1-071477; St. Julian, Malta, Mar. 26-30, 2007; XP050105412.

(Continued)

*Primary Examiner* — Kouroush Mohebbi
(74) *Attorney, Agent, or Firm* — Vincent J. Allen; James H. Ortega; Carstens & Cahoon, LLP

(57) ABSTRACT

A method and device for performing a contention based random access procedure by a mobile communication terminal in communication with a base station. The method according to an embodiment includes transmitting a random access preamble message to the base station; receiving a random access response from the base station, the random access response including a timing advance command; determining a status of a mobile communication terminal time alignment timer; and ignoring the timing advance command if the mobile communication terminal time alignment timer is determined to be running in the determining step.

8 Claims, 9 Drawing Sheets

(56) References Cited

U.S. PATENT DOCUMENTS

| | | |
|---|---|---|
| 2009/0046641 A1 | 2/2009 | Wang et al. |
| 2009/0196208 A1 | 8/2009 | Yu et al. |
| 2009/0300457 A1* | 12/2009 | Kuo .............................. 714/749 |
| 2010/0027484 A1 | 2/2010 | Imamura et al. |
| 2010/0111067 A1* | 5/2010 | Wu ................................ 370/345 |
| 2010/0254356 A1* | 10/2010 | Tynderfeldt et al. .......... 370/336 |
| 2010/0279695 A1* | 11/2010 | Amirijoo et al. .............. 455/438 |
| 2011/0110240 A1* | 5/2011 | Bergquist et al. .......... 370/241.1 |

OTHER PUBLICATIONS

3GPP TSG-RAN2 Meeting #61: E-UTRA MAC Protocol Specification Update; R2-081389, Sorrento, Italy, Feb. 11-15, 2008; XP050139110.

European Search Report dated Nov. 2, 2011 for corresponding European Patent Application No. 090030203.8.

U.S. Appl. No. 60/985,379, filed Nov. 5, 2007 with the USPTO.

* cited by examiner

METHOD OF PERFORMING UPLINK SYNCHRONIZATION IN RANDOM ACCESS PROCEDURE

CROSS REFERENCE TO RELATED APPLICATIONS

This application is continuation of U.S. application Ser. No. 12/392,654 filed on Feb. 25, 2009 now U.S. Pat. No 7,843,895, which claims priority to Korean Patent Application No. 2008-0023807 filed on Mar. 14, 2008. The entire contents of each of these applications are incorporated herein by reference.

BACKGROUND OF THE INVENTION

1. Field of the Invention

The present invention relates to wireless communications, and more particularly, to a method of performing uplink synchronization through a random access procedure in a wireless communication system.

2. Discussion of the Background Art

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

In general, there are one or more cells within the coverage of a base station (BS). One cell may include a plurality of UEs. A UE generally performs a random access procedure to access a network. The random access procedure is performed for various purposes, for example, for uplink synchronization between the UE and the network, uplink radio resource allocation request, etc.

The random access procedure starts when the UE transmits a random access preamble. The UE randomly selects one random access preamble from predetermined 64 random access preambles, and transmits the selected random access preamble. Although one preamble is randomly selected from 64 random access preambles, two or more UE can simultaneously perform the random access procedure by using the same random access preamble. This is called a contention-based random access procedure. On the contrary, when a dedicated random access preamble is assigned to each UE, it is called a non-contention based random access procedure.

One of the purposes of performing the random access procedure is to perform uplink synchronization. When collision occurs between UEs in the contention based random access procedure, whether collision occurs or not cannot be known until contention resolution is achieved between the BS and the UE. Therefore, even if collision occurs, the UE may perform uplink synchronization by using time alignment information transmitted from the BS, resulting in incorrect synchronization. The incorrect uplink synchronization performed by the UE may act as interference to another UE, which may lead to deterioration in reliability of a communication system.

SUMMARY OF THE INVENTION

The present invention provides a method of preventing a user equipment from performing incorrect uplink synchronization when the user equipment fails in contention resolution in a random access procedure.

The present invention also provides a method of preventing one user equipment from causing interference to another user equipment when synchronization correction is not properly achieved in a random access procedure.

In an aspect of the invention, there is a method of performing a contention based random access procedure by a mobile communication terminal in communication with a base station. The method includes transmitting a random access preamble message to the base station; receiving a random access response from the base station, the random access response including a timing advance command; determining a status of a mobile communication terminal time alignment timer; and ignoring the timing advance command if the mobile communication terminal time alignment timer is determined to be running in the determining step.

In an aspect of the invention, the timing advance command is configured to adjust, start or restart the mobile communication terminal time alignment timer.

In an aspect of the invention, the method includes initiating contention resolution by transmitting a scheduled message to the base station.

In an aspect of the invention, the method includes applying the timing advance command to the mobile communication terminal time alignment timer if the mobile communication terminal time alignment timer is determined to be not running or to be expired.

In an aspect of the invention, the step of ignoring the timing advance command includes storing the time alignment data received via the random access response.

In an aspect of the invention, the method includes applying the stored time alignment data if the mobile communication terminal time alignment timer expires before contention resolution is completed.

In an aspect of the invention, the method includes discarding the time alignment information and not stopping the mobile communication terminal time alignment timer if contention resolution fails.

In an aspect of the invention, the step of not stopping the time alignment timer includes maintaining previously assigned resources.

In an aspect of the invention, the step of maintaining previously assigned resources includes maintaining a physical uplink control channel (PUCCH), sounding reference symbols (SRS), any configured downlink assignments and uplink grants.

In an aspect of the invention, there is a mobile communication terminal configured to perform a contention based random access procedure with a base station. The mobile communication terminal includes a transceiver; a display; and a processor operatively connected to the transceiver and display, the processor including a time alignment timer. The processor is configured to transmit a random access preamble message to the base station; receive a random access response from the base station, the random access response including a timing advance command; determine a status of the time alignment timer; and ignore the timing advance command if the mobile communication terminal time alignment timer is determined to be running.

In an aspect of the invention, the timing advance command is configured to adjust, start or restart the mobile communication terminal time alignment timer.

In an aspect of the invention, the processor is configured to initiate contention resolution by transmitting a scheduled message to the base station.

In an aspect of the invention, the processor is configured to apply the timing advance command to the time alignment timer if the time alignment timer is determined to be not running or to be expired.

In an aspect of the invention, the processor is configured to store the time alignment data received via the random access response.

In an aspect of the invention, the processor is configured to apply the stored time alignment data if the time alignment timer expires before contention resolution is completed.

In an aspect of the invention, the processor is configured to discard the time alignment information and not stop the time alignment timer if contention resolution fails.

In an aspect of the invention, the processor is configured to maintain previously assigned resources if the time alignment timer is not stopped.

In an aspect of the invention, the processor is configured to maintain a physical uplink control channel (PUCCH) sounding reference symbols (SRS), any previously configured downlink assignments and uplink grants, if the time alignment timer is not stopped.

In an aspect of the invention, there is a method of performing a contention based random access procedure by a mobile communication terminal in communication with a base station. The method includes transmitting a random access preamble message to the base station; receiving a random access response from the base station, the random access response including a timing advance command; determining a status of a mobile communication terminal time alignment timer; and if the mobile communication terminal time alignment timer is determined to be running in the determining step, ignoring the timing advance command, and transmitting a scheduled message to the base station in correspondence with the running mobile communication terminal time alignment timer.

In an aspect of the invention, if the mobile communication terminal time alignment timer is determined to be not running or to be expired, the method includes applying the timing advance command to restart the mobile communication terminal time alignment timer, and transmitting a scheduled message to the base station in correspondence with the restarted mobile communication terminal time alignment timer.

Even if a user equipment fails in contention resolution in a random access procedure, it is possible to prevent a case where uplink transmission fails due to incorrect uplink synchronization, which leads to interference to another equipment.

DETAILED DESCRIPTION OF THE INVENTION

Figure 1:
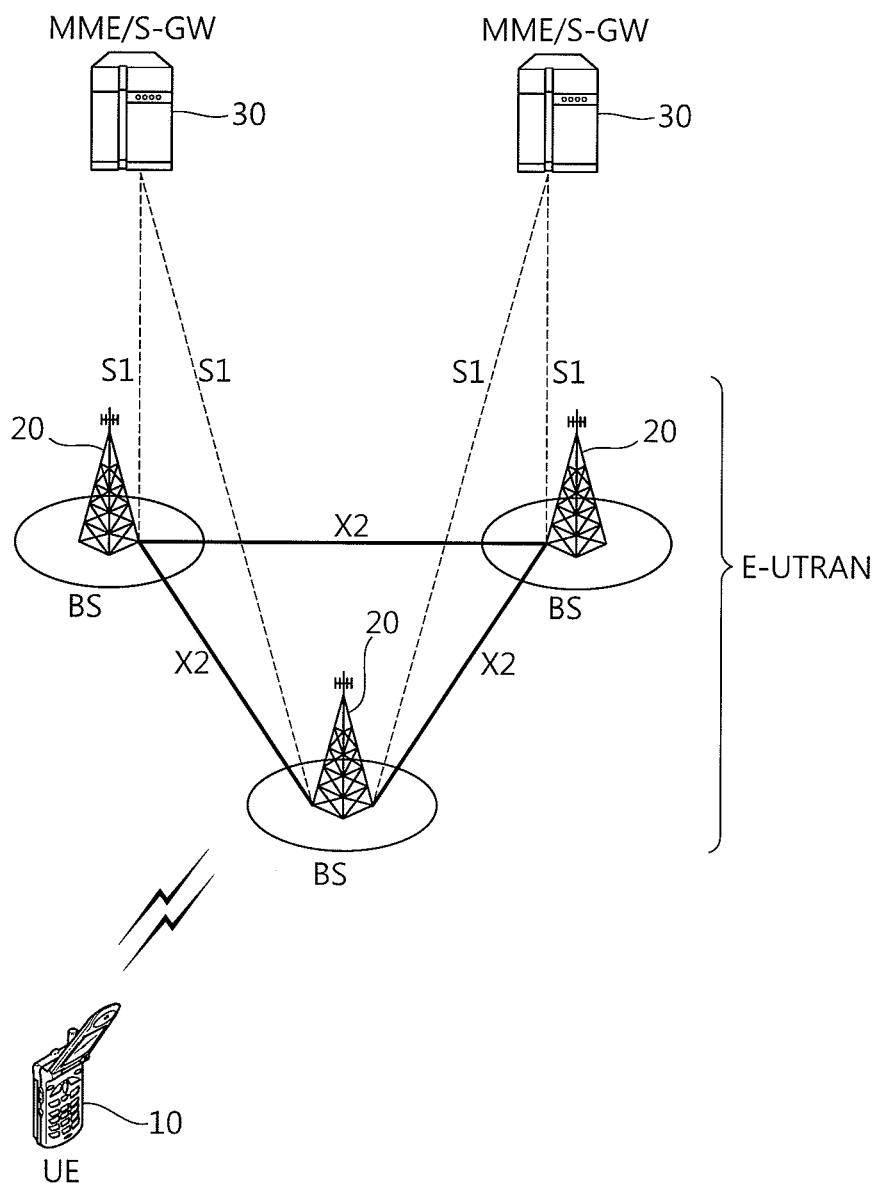
FIG. 1 shows an example of a structure of a wireless communication system according to an embodiment of the invention.

FIG. 1 shows an example of a structure of a wireless communication system according to an embodiment of the invention. The wireless communication system may have a network structure of an evolved-universal mobile telecommunications system (E-UMTS). The E-UMTS may also be referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
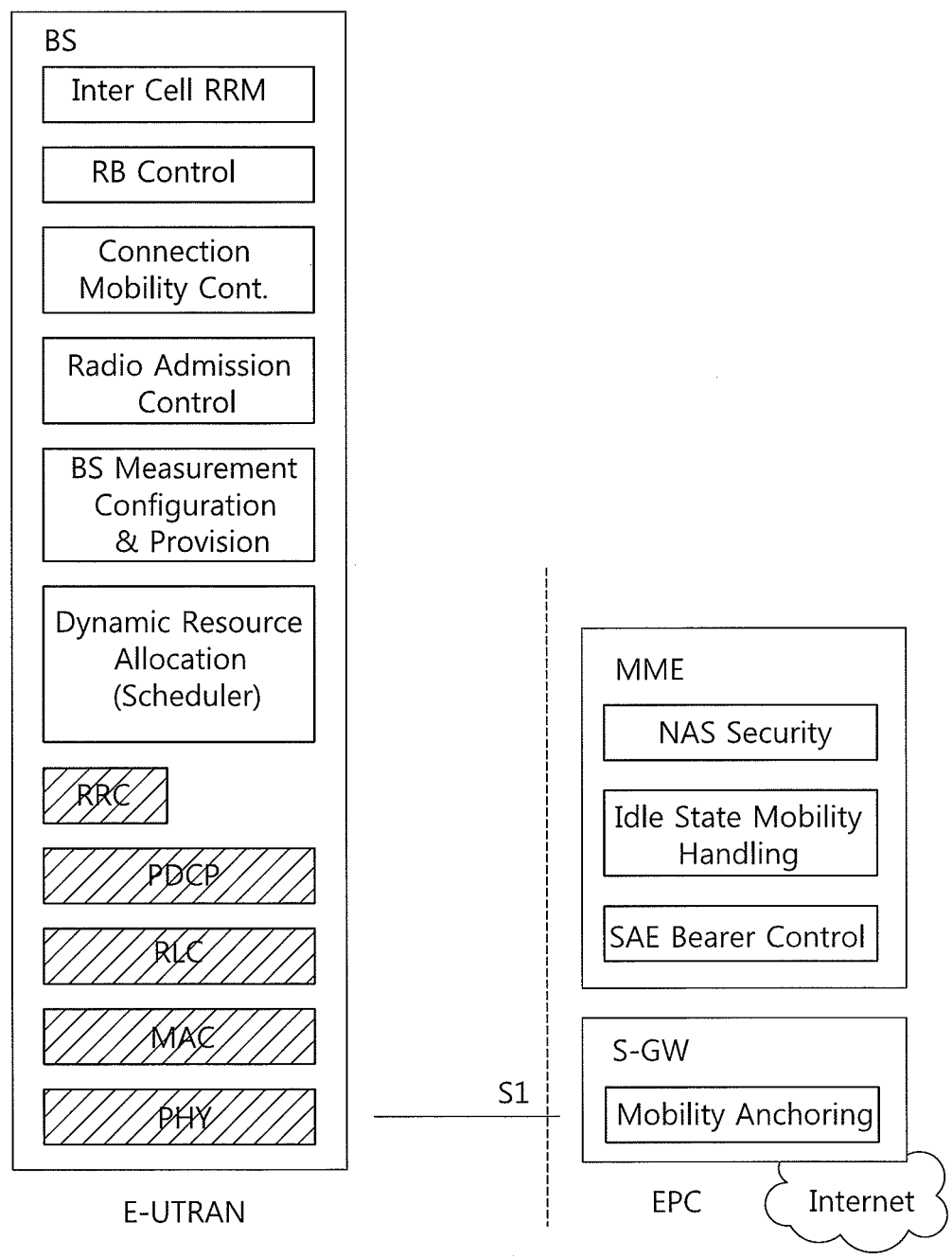
FIG. 2 is a diagram showing an example of functional split between an evolved universal terrestrial radio access network (E-UTRAN) and an evolved packet core (EPC) according to an embodiment of the invention.

FIG. 2 is a diagram showing an example of a functional split between the E-UTRAN and the EPC according to an embodiment of the invention.

Referring to FIG. 2, slashed boxes depict radio protocol layers and white boxes depict functional entities of the control plane.

The BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) distribution of paging messages to BSs; (2) security control; (3) idle state mobility control; (4) system architecture evolution (SAE) bearer control; and (5) ciphering and integrity protection of non-access stratum (NAS) signaling.

The S-GW performs the following functions: (1) termination of user plane packet for paging; and (2) user plane switching for the support of UE mobility.

Figure 3:
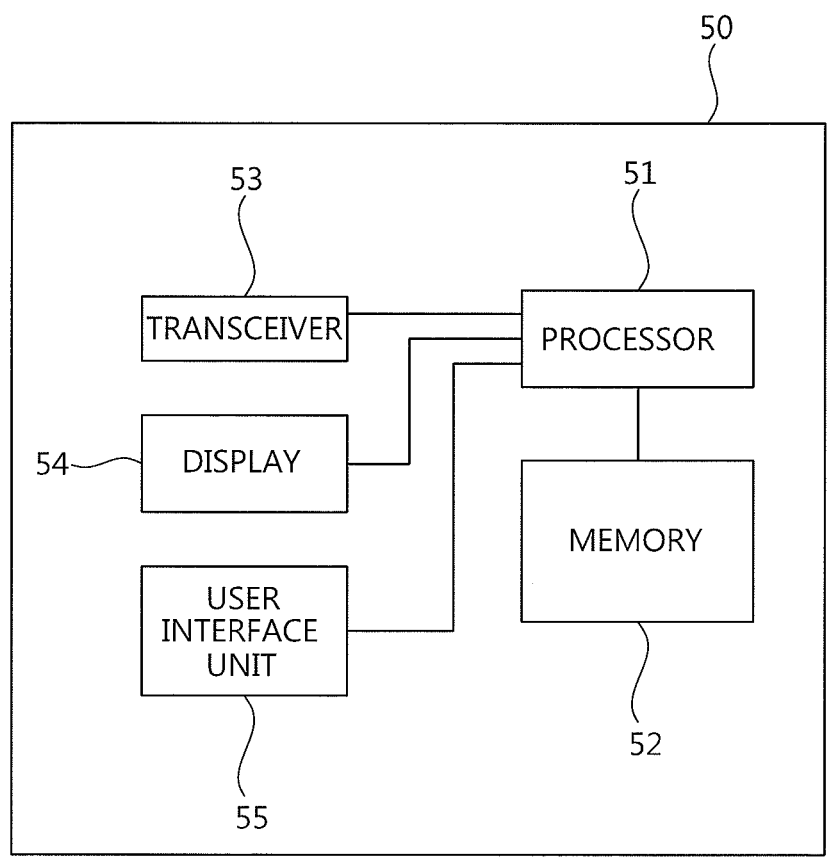
FIG. 3 is a block diagram showing constitutional elements of an example of a user equipment according to an embodiment of the invention.
Figure 8:
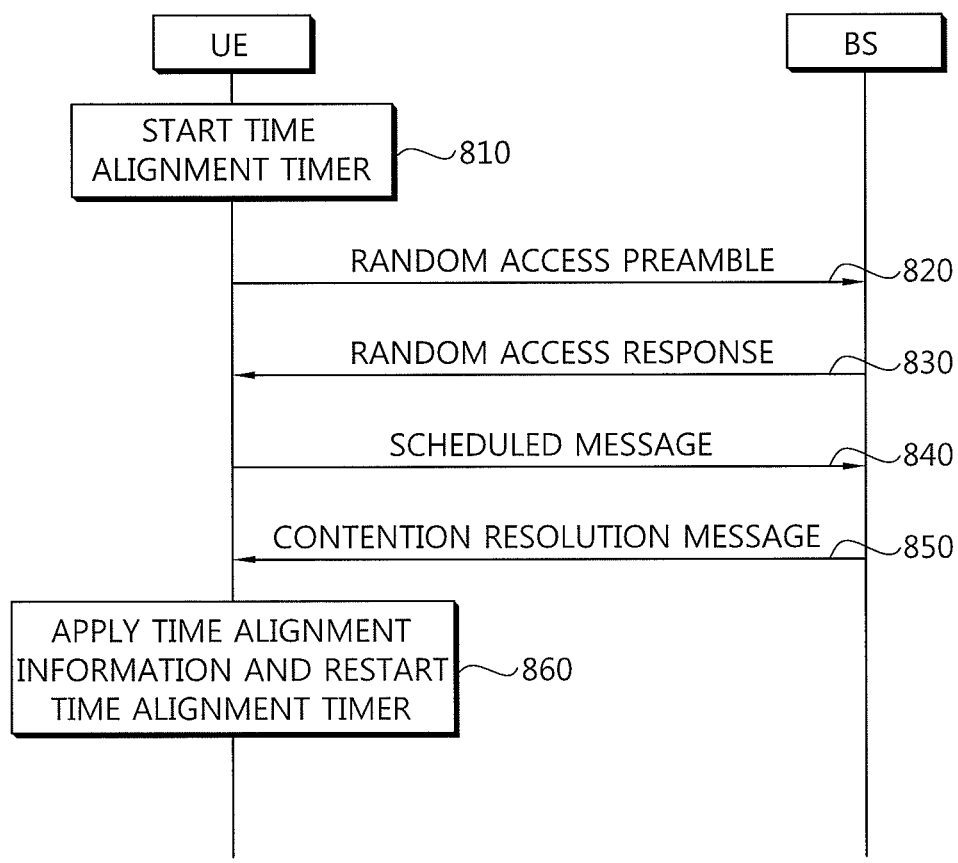
FIG. 8 is a flow diagram showing a random access procedure according to an embodiment of the present invention.
Figure 9:
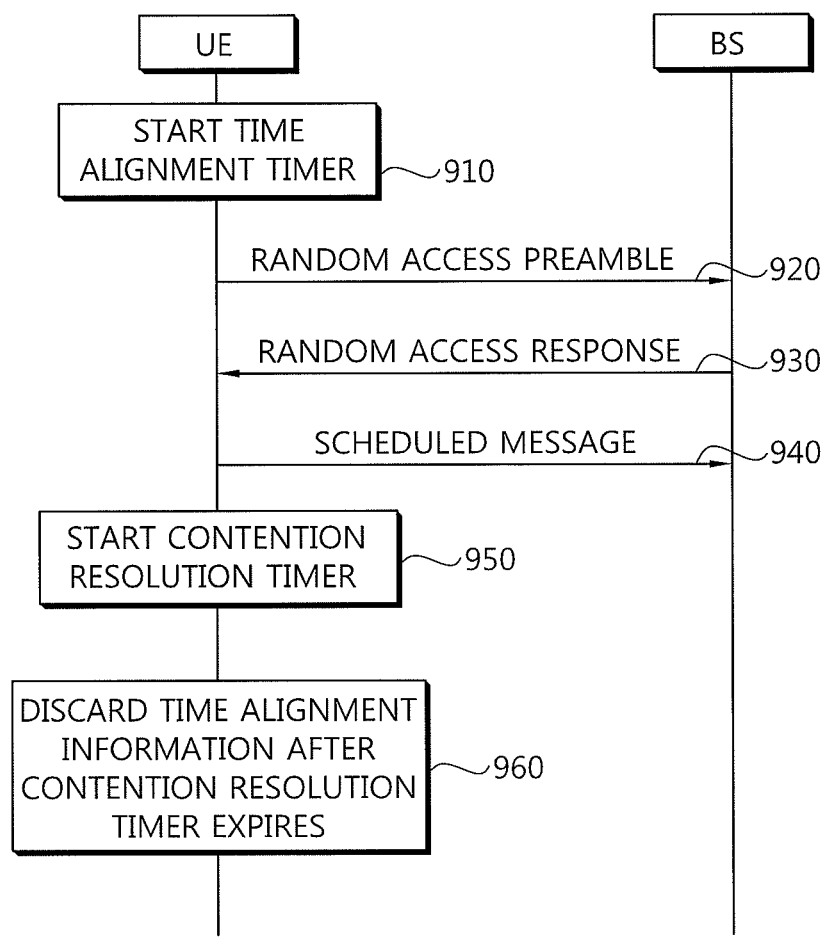
FIG. 9 is a flow diagram showing a random access procedure according to an embodiment of the present invention.

FIG. 3 is a block diagram showing constitutional elements of an example of a UE according to an embodiment of the invention and configured to perform the methods shown in FIGS. 8-9. A UE 50 includes a processor 51, a memory 52, a transceiver 53, a display 54, and a user interface unit 55. Layers of the radio interface protocol are implemented in the processor 51. The processor 51 provides the control plane and the user plane. The function of each layer can be implemented in the processor 51. The memory 52 is coupled to the processor 51 and stores an operating system, applications, and general files. The display 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The transceiver 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
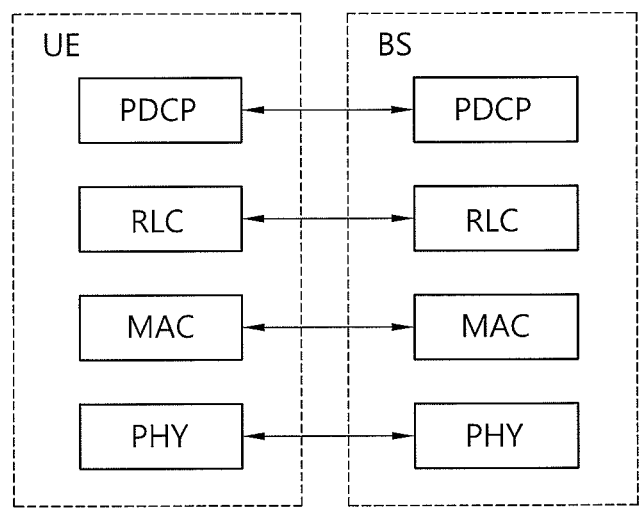
FIG. 4 is a diagram showing an example of a radio protocol architecture for a user plane according to an embodiment of the invention.
Figure 5:
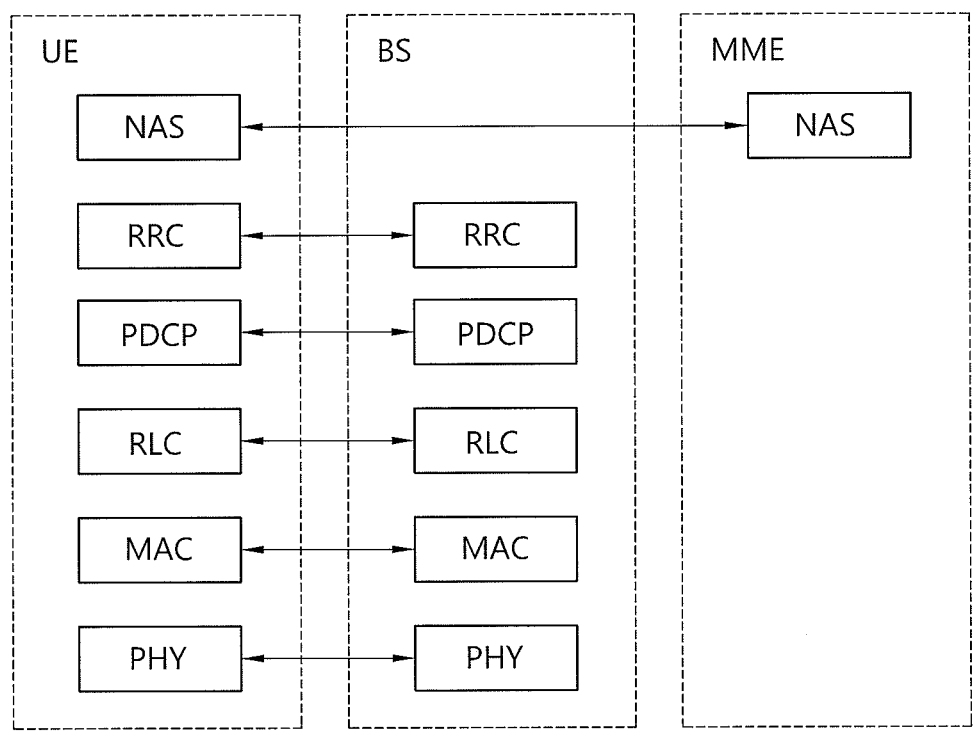
FIG. 5 is a diagram showing an example of a radio protocol architecture for a control plane according to an embodiment of the invention.

FIG. 4 is a diagram showing an example of a radio protocol architecture for the user plane according to an embodiment of the invention. FIG. 5 is a diagram showing an example of a radio protocol architecture for the control plane according to an embodiment of the invention. They illustrate the architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data is transferred through the physical channel. In the PHY layer, modulation is performed using an orthogonal frequency division multiplexing (OFDM) scheme and time and frequency can be utilized as a radio resource.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC protocol data unit (PDU) fails.

A packet data convergence protocol (PDCP) belonging to the second layer performs header compression function. When transmitting an Internet protocol (IP) packet such as an IPv4 packet or an IPv6 packet, the header of the IP packet may contain relatively large and unnecessary control information. The PDCP layer reduces the header size of the IP packet so as to efficiently transmit the IP packet.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Data is transmitted from the network to the UE through a downlink transport channel. Examples of the downlink transport channel include a broadcast channel (BCH) for transmitting system information and a downlink-shared channel (DL-SCH) for transmitting user traffic or control messages. User traffic of downlink multicast or broadcast service or control messages can be transmitted on the DL-SCH or a downlink multicast channel (MCH). Data is transmitted from the UE to the network through an uplink transport channel. Examples of the uplink transport channel include a random access channel (RACH) for transmitting an initial control message and an uplink-shared channel (UL-SCH) for transmitting user traffic or control message.

Downlink physical channels are mapped to the downlink transport channels. Examples of the downlink physical channels include a physical broadcast channel (PBCH) mapped to the BCH, a physical multicast channel (PMCH) mapped to the MCH, a physical downlink shared channel (PDSCH) mapped to the PCH and the DL-SCH, and a physical downlink control channel (PDCCH) for transmitting control information (e.g., downlink (DL)/uplink (UL) scheduling grant, etc.,) which is provided from the first layer and the second layer. The PDCCH is also referred to as a downlink L1 /L2 control channel. Uplink physical channels are mapped to the uplink transport channels. Examples of the uplink physical channels include a physical uplink shared channel (PUSCH) mapped to the UL-SCH, a physical random access channel (PRACH) mapped to the RACH, and a physical uplink control channel (PUCCH) for transmitting control information (e.g., hybrid automatic repeat request (HARD) acknowledgment (ACK)/negative-ACK (HACK) signals, a scheduling request signal, a channel quality indicator (CQI), etc.,) which is provided from the first layer and the second layer.

Figure 6:
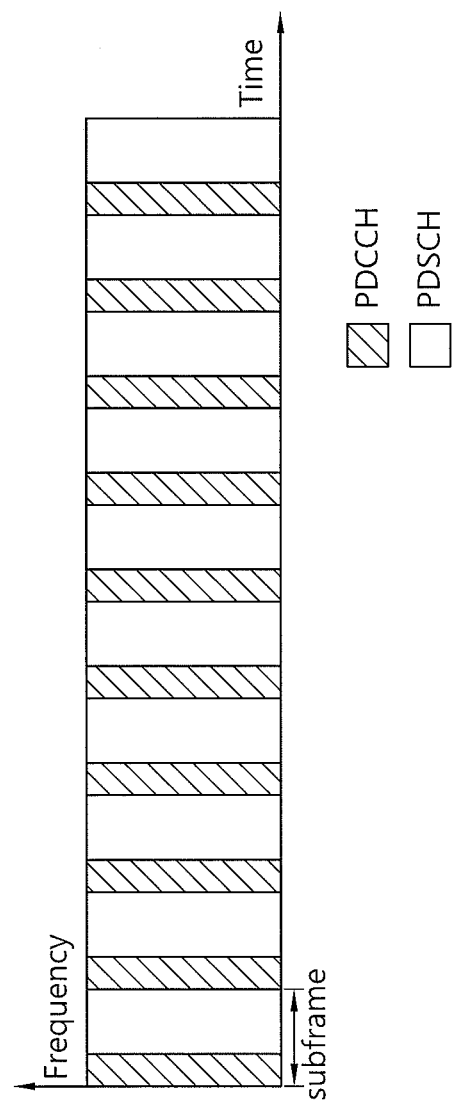
FIG. 6 shows an example of a structure of a subframe according to an embodiment of the invention.

FIG. 6 shows an example of a structure of a subframe according to an embodiment of the invention.

Referring to FIG. 6, a subframe includes a plurality of OFDM symbols and a plurality of subcarriers. The subframe is a basic unit of radio resource allocation. One subframe consists of a plurality of resource blocks. One resource block includes a plurality of subcarriers (e.g., 12 subcarriers). The subframe can be divided into a region where a physical downlink control channel (PDCCH) (also referred to as an L1/L2 control channel) is transmitted and a region where a physical downlink shared channel (PDSCH) is transmitted. For example, the PDCCH may correspond to first three OFDM symbols in the subframe. A time for transmitting one subframe is referred to as a transmission time interval (TTI). For example, 1 TTI may be 1 millisecond (ms). One subframe can be divided into two slots in the time domain. If 1 TTI=1 ms, one slot has a length of 0.5 ms.

Figure 7:
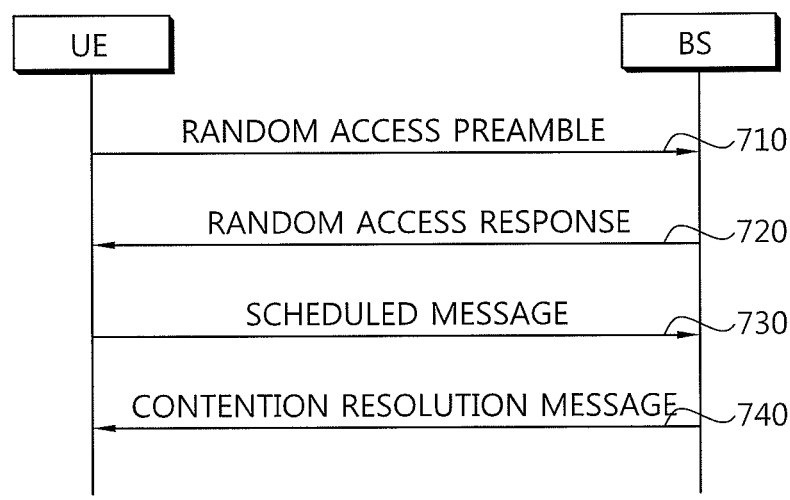
FIG. 7 is a flow diagram showing a related art random access procedure.

FIG. 7 is a flow diagram showing a related art random access procedure.

The random access procedure may be performed for the following purposes: (1) an initial access process; (2) a handover process; (3) a process of transmitting downlink data to a UE that is not time synchronized; (4) a process of transmitting data in uplink by the UE that is not time synchronized; and (5) a recovery process performed when an error occurs in a wireless connection.

Referring to FIG. 7, a UE randomly selects a random access preamble from a plurality of available random access preambles. The information to generate the plurality of available random access preambles can be received as a part of system information. The UE transmits the randomly selected random access preamble to the BS by using a PRACH resource (step 710).

Upon receiving the random access preamble from the UE, the BS transmits a random access response to the UE through a DL-SCH (step 720). The random access response may include time alignment information (i.e., a time advance value or timing advance) for correcting uplink time alignment, uplink radio resource allocation, an index of the random access preamble (i.e., preamble identifier (Id)), a temporary cell-radio network temporary identifier (C-RNTI), etc. The random access response on the DL-SCH can be indicated by a PDCCH addressed by a random access identifier. The random access identifier is also referred to as a random access-radio network temporary identifier (RA-RNTI).

After receiving random access response, the UE can correct time alignment based on the time alignment information. However, in an embodiment of the present invention, instead of correcting time alignment immediately after the UE receives the random access response, time alignment information may be temporarily stored so that time alignment can be corrected by using the time alignment information when a certain condition (i.e., contention resolution, etc.) is satisfied. This process will be described below in greater detail with reference to FIG. 8.

The UE transmits a scheduled message to the BS through a UL-SCH by using the uplink radio resource allocation in the random access response (step 730).

Upon receiving the scheduled message, the BS transmits a contention resolution message to the UE (step 740).

Now, contention resolution performed in a random access procedure will be described in detail.

Collision occurs in the random access process because the number of available random access preambles is limited while a large number of UEs are used. That is, it is difficult for the BS to provide respective dedicated random access preambles to all UEs. Therefore, one UE needs to randomly select and transmit one of random access preambles provided also to other UEs. Accordingly, in some cases, two or more UEs may select and transmit the same random access preamble by using the same PRACH resource. This is called a contention state.

The BS regards two or more identical random access preambles transmitted from two or more UEs as one random access preamble transmitted from one UE. Further, the BS transmits to the UEs the same random access response for the received random access preamble.

When collision occurs, the same random access response is received by the two or more UEs, and the respective UEs perform different operations according to one random access response. That is, by using the uplink radio resource allocation in the random access response, the UEs transmit different scheduled messages. Accordingly, the UEs may fail to transmit the scheduled message, or only a specific UE may succeed in transmitting the scheduled message according to a location or a transmit power of each UE.

In the latter case where only the specific UE succeeds in transmitting the scheduled message, two or more UEs determine that they succeed in data transmission. Therefore, the BS has to inform the UEs, which have failed in contention, of the fact that data transmission has failed. That is, contention resolution is an operation of informing a UE of whether contention caused by collision is successful or unsuccessful when collision occurs between UEs in the random access procedure.

There are two conventional contention resolution methods, that is, a first method of using a contention resolution timer and a second method of transmitting an identifier of a UE which succeeds in contention.

In the first conventional method, it is required that the UE already has a unique cell identifier (e.g., C-RNTI) before a random access procedure is performed. The UE which already has its cell identifier transmits data including the cell identifier to the BS according to a random access response message, and then starts the contention resolution timer. If the UE receives the data including the cell identifier through a PDCCH before the contention resolution timer expires, the UE determines that the UE succeeds in contention and thus successfully finishes the random access procedure.

On the contrary, in the first method, if the UE fails to receive the data including the cell identifier through the PDCCH before the contention resolution timer expires, the UE determines that the UE fails in contention. Then, the UE may re-perform the random access procedure or may provide a failure report to an upper layer.

The second conventional method of the two contention resolution methods is used when the UE does not have its unique cell identifier before the random access procedure is performed. That is, if the UE does not have its cell identifier, the UE transmits data including an S-temporary mobile subscriber identity (S-TMSI) or a random Id which is a higher-level identifier than a cell identifier according to uplink radio resource allocation in the random access response, and then starts the contention resolution timer.

If the data including the higher-level identifier is transmitted through a DL-SCH before the contention resolution timer expires, the UE determines that the random access procedure is successful. On the contrary, if the UE fails to receive the data including the higher-level identifier through the DL-SCH before the contention resolution timer expires, the UE determines that the random access procedure is unsuccessful.

Now, time alignment and time alignment correction will be described. The random access procedure is one of methods for uplink time alignment.

When collision does not occur, a time alignment correction method is performed according to the random access procedure as follows. A BS can measure a time alignment value by using a random access preamble transmitted from a UE, and provide time alignment information for time alignment correction to the UE. Upon receiving the random access response, the UE applies the received time alignment information, and starts or restarts a time alignment timer.

It is assumed that time alignment is maintained between the UE and the BS while the time alignment timer is running. Further, it is also assumed that time alignment is not maintained between the UE and the BS when the timer alignment timer expires. The BS can measure a time alignment value of the UE by using another method other than the method of using the random access preamble. The BS can optionally provide the time alignment information to the UE.

Upon receiving the time alignment information, the UE applies the received time alignment information, and starts or restarts the time alignment timer. When the time alignment timer expires, it is prohibited for the UE to perform uplink transmission except for transmission of the random access preamble.

In the random access procedure, there already exists a possibility of collision. As a result, incorrect time alignment information may be applied to the UE due to collision. That is, if time alignment is achieved before the UE transmits the random access preamble, incorrect uplink transmission may be caused due to collision. Accordingly, time alignment is corrected using incorrect time alignment information.

In the following description, it is assumed that uplink time alignment is achieved between the UE and the BS. In this case, time alignment timers used in the UE and the BS are synchronized with each other. It is also assumed that uplink data transmission is requested in a state where the UE does not have an uplink radio resource, and thus the UE performs a random access procedure.

The UE transmits a random access preamble to the BS, and receives a random access response. The UE applies time alignment information included in the received random access response to the UE itself, and starts the time alignment timer.

If collision occurs and thus the received random access response is a random access response to be transmitted to another UE, the UE may receive incorrect time alignment information. However, since the time alignment information included in the random access response is applied to the UE and thus the time alignment timer is running in the UE, the UE determines that time alignment is achieved between the UE and the BS. Therefore, if data reception is requested after the UE receives random access response information, the UE attempts uplink transmission according to the incorrect time alignment, resulting in interference to transmission of other UEs.

Accordingly, when the random access procedure is performed by the UE which is time-aligned with the BS, the time alignment information included in the random access response is applied after contention resolution is completed. That is, the UE applies the time alignment information after collision occurs, and then can start or restart the time alignment timer.

FIG. 8 is a flow diagram showing a random access procedure according to an embodiment of the present invention. This is a case where a UE performing the random access procedure succeeds in contention caused by collision.

Referring to FIG. 8, the UE operates in a state where uplink time alignment is achieved between the UE and a BS and a time alignment timer is running (step 810). That is, the UE has a valid time alignment value, and the time alignment timer is running in the UE.

When uplink data transmission is requested in a situation where there is no uplink radio resource, the UE starts a contention based random access procedure. Accordingly, the UE transmits a selected random access preamble to the BS (step 820). The BS receives the random access preamble from the UE and then transmits a random access response to the UE in response thereto (step 830). The random access response may include radio resource allocation for transmitting a scheduled message, a preamble identifier, time alignment information (e.g., a timing advance command), a temporary C-RNTI, etc.

If, upon receipt of the time alignment information, the UE's time alignment timer is determined to be running, the UE neither applies the received time alignment information nor starts the time alignment timer (e.g., until contention resolution is completed). Instead received time alignment information may be stored in a buffer and the UE maintains a previous time alignment value used before the random access procedure is performed and also maintains an operation of the time alignment timer which is currently running. In other words, the UE ignores the received time alignment information and maintains a previous time alignment value used before the random access procedure is performed and also maintains an operation of the time alignment timer that is currently running. The UE may apply the stored time alignment data if the mobile communication terminal time alignment timer expires before contention resolution is completed.

The UE transmits to the BS the scheduled message including an identifier (e.g., C-RNTI, S-TMSI, random Id, etc.) by using the radio resource allocation information (i.e., UL grant information) included in the received random access response (step 840). Thereafter, the UE receives a contention resolution message before a contention resolution timer included in the UE expires (step 850).

If the UE receives a decodable contention resolution message before the contention resolution timer expires, the UE determines that the UE succeeds in contention caused by collision. That is, if the received contention resolution message is a PDCCH including a cell identifier of the UE or a DL-SCH including a higher-level identifier (S-TMSI or random Id) of the UE, the UE determines the UE succeeds in contention.

If, after receipt of the time alignment information, the UE's time alignment timer is determined to be not running or to be expired, the UE applies time alignment information obtained from random access information to a previous time alignment value. Then, the UE restarts the time alignment timer (step 860).

FIG. 9 is a flow diagram showing a random access procedure according to an embodiment of the present invention. This is a case where a UE performing the random access procedure fails in contention caused by collision.

Referring to FIG. 9, the UE operates in a state where uplink time alignment is achieved between the UE and a BS and a time alignment timer is running (step 910). The UE transmits a selected random access preamble to the BS (step 920). The BS receives the random access preamble from the UE and then transmits a random access response to the UE in response thereto (step 930). The UE neither applies the received time alignment information nor starts the time alignment timer until contention resolution is completed. The received time alignment information is stored in a buffer. The UE maintains a previous time alignment value used before the random access procedure is performed and also maintains an operation of the time alignment timer which is currently running. The UE transmits to the BS a scheduled message including an identifier by using the radio resource allocation information (i.e., UL grant information) included in the received random access response (step 940).

After receiving the scheduled message, the UE starts a contention resolution timer (step 950). Unlike the embodiment of FIG. 8, the UE cannot receive its contention resolution message from the BS after the contention resolution timer starts until the contention resolution timer expires. For example, a cell identifier or a higher-level identifier of the UE may not be included in the contention message, or the contention message including the cell identifier or the higher-level identifier of the UE may not be received by the UE before the contention resolution timer expires. In this case, the UE determines that the UE fails in contention.

When the contention resolution timer expires, the UE does not apply the received time alignment information but discards the time alignment information (step 960) but does not stop the time alignment timer. Accordingly, a previous operation of the time alignment timer is maintained without alteration. Thus, previously assigned resources (e.g., PUCCH, sounding reference symbols (SRS), any previously configured downlink assignments and uplink grants) are maintained.

Because the received time alignment information is not applied when the UE fails in contention, transmission error or interference can be reduced when uplink synchronization is incorrectly achieved.

The methods of FIGS. 8-9 may be performed in a device similar the one depicted in FIG. 3, or in another device. The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of performing a random access procedure by a mobile terminal in communication with a base station, comprising:
    starting a time alignment timer upon applying first time alignment information that is received from a base station, the time alignment timer being used to control how long the mobile terminal is considered uplink time aligned;
    transmitting a random access preamble to the base station,
    wherein the transmitted random access preamble is selected by the mobile terminal;
    receiving from the base station a random access response as a response to the random access preamble, the random access response including an uplink resource assignment and second time alignment information;
    wherein the random access procedure is a contention based random access procedure, and:
        if the time alignment timer is running and contention resolution has not been completed, ignoring the second time alignment information even if the mobile terminal is not time aligned with the base station; and
        if the time alignment timer is not running, applying the second time alignment information.

2. The method of claim 1, further comprising:
    initiating contention resolution with another mobile terminal trying the random access procedure by transmitting a scheduled message using the uplink resource assignment to the base station.

3. The method of claim 1, wherein the random access preamble is randomly selected by the mobile terminal from a plurality of available random access preambles when the random access procedure is contention based.

4. The method of claim 1, further comprising:
    if the time alignment timer is running, storing the second time alignment information and subsequently applying the stored time alignment data after the time alignment timer expires.

5. A mobile terminal configured to perform a random access procedure with a base station, the mobile terminal comprising:
    a radio frequency (RF) unit; and
    a processor operatively connected to the display and configured to:
    start a time alignment timer upon applying first time alignment information that is received from a base station, the time alignment timer being used to control how long the mobile terminal is considered uplink time aligned,
    transmit a random access preamble to the base station,
    wherein the transmitted random access preamble is selected by the mobile terminal,
    receive from the base station a random access response as a response to the random access preamble, the random access response including an uplink resource assignment and second time alignment information,
    wherein the random access procedure is a contention based random access procedure, and:
        if the time alignment timer is running and contention resolution has not been completed, ignoring the second time alignment information even if the mobile terminal is not time aligned with the base station, and
        if the time alignment timer is not running, apply the second time alignment information.

6. The mobile terminal of claim 5, wherein the processor is configured to initiate contention resolution with another mobile terminal trying the random access procedure by transmitting a scheduled message using the uplink resource assignment to the base station when the uplink is synchronized.

7. The mobile terminal of claim 5, wherein the processor is configured to randomly select the random access preamble from a plurality of available random access preambles when the random access procedure is contention based.

8. The mobile terminal of claim 5, wherein, if the time alignment timer is running, the processor is further configured to store the second time alignment information and subsequently apply the stored time alignment data after the time alignment timer expires.

* * * * *